United States Patent
Momiyama

[11] 3,944,339
[45] Mar. 16, 1976

[54] LARGE APERTURE PHOTOGRAPHIC OBJECTIVE

[75] Inventor: Kikuo Momiyama, Chofu, Japan

[73] Assignee: Canon Kabushiki Kaisha, Tokyo, Japan

[22] Filed: July 3, 1974

[21] Appl. No.: 485,555

[30] Foreign Application Priority Data
July 7, 1973   Japan.................. 48-76162

[52] U.S. Cl................................. 350/220; 350/206
[51] Int. Cl.²....................................... G02B 9/34
[58] Field of Search........................... 350/220, 206

[56] References Cited
UNITED STATES PATENTS

| | | | |
|---|---|---|---|
| 1,955,617 | 4/1934 | Warmisham | 350/220 X |
| 3,011,402 | 12/1961 | Johnson | 350/220 X |
| 3,466,115 | 9/1969 | Ruben | 350/220 |

Primary Examiner—John K. Corbin
Attorney, Agent, or Firm—Toren, McGeady and Stanger

[57] ABSTRACT

A photographic objective lens system for adaption with a diaphragm located in front of the entire system. The lens system comprises positive front and rear lenses and a negative intermediate lens in optical alignment with each other. The front lens is in the form of a positive meniscus doublet composed of a double convex lens and double concave lens cemented together at their adjoining surfaces. The intermediate lens is a double concave singlet. The rear lens consists of a positive meniscus front singlet of rearward convexity and a positive meniscus rear singlet of forward convexity. This objective is so designed as to have a relative aperture of at most two in F-number and a field angle as wide as 44° while nevertheless preserving an excellent state of correction of various aberrations.

4 Claims, 8 Drawing Figures

SPHERICAL ABERRATION  ASTIGMATISM  DISTORTION

SINE CONDITION

LARGE APERTURE PHOTOGRAPHIC OBJECTIVE

BACKGROUND OF THE INVENTION

This invention relates to photographic objective lens systems having a relative aperture of at least f/2.0 and field angle as wide as 44°, and more particularly to a photographic objective lens system adapted for use with a diaphragm located outwardly of the entire lens system while nevertheless an excellent state of correction of the image aberrations is preserved even in such situation.

The commonly known photographic objective lens systems are designed so that the diaphragm is located within an air space of the lens system, and, therefore, the entrance and exit pupils lie inside of the lens system. In some special photography, however, it is required for the objective lens to have a pupil lying outwardly thereof. For example, with specially designed cameras, it is desired because of the arrangement and construction of the mechanism thereof to position the shutter, diaphragm and the like in front of the objective lens. In this case, there is required the front diaphragm type of objective lens.

SUMMARY OF THE INVENTION

The lens design parameters of such an objective lens system are seriously limited in the possibility of establishing certain relationships because of the high tendency of producing various aberrations, so that a high degree of correction of the image aberrations are considerably difficult to accomplish. Particularly with an objective lens having an abnormally large relative aperture compared to an ordinary objective, such a difficulty is remarkably intensified. The present invention is adapted to overcome the above-mentioned problem. Accordingly, the object of the invention is to provide a photographic objective lens system having a large relative aperture along with an excellent state of correction of the image aberrations.

DESCRIPTION OF THE PREFERRED EMBODIMENTS

Figure 1:
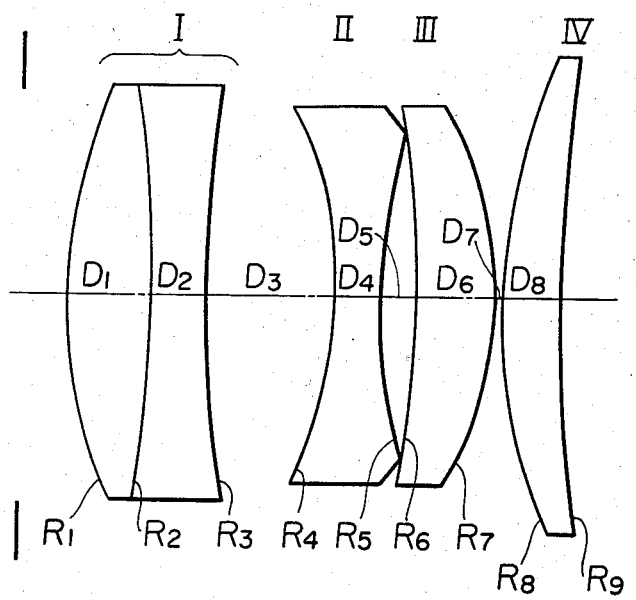
FIG. 1 is a diagrammatic view of an objective lens system according to a preferred embodiment of the present invention.
Figure 3:
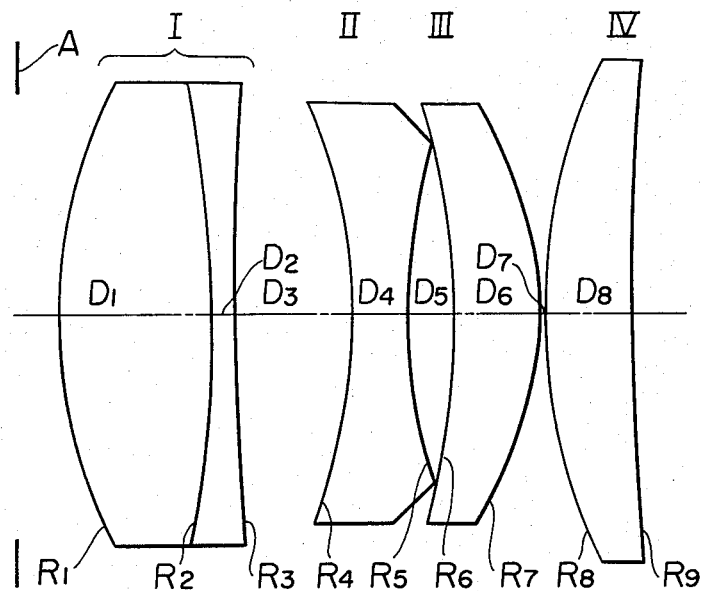
FIG. 3 is a diagrammatic view of an objective lens system according to another preferred embodiment of the present invention.

Referring to FIGS. 1 and 3, the objective lens system according to the present invention is illustrated as comprising four optically aligned lens components with five lens elements. Character A indicates a diaphragm position. The first component I is in the form of a positive meniscus doublet composed of a double convex lens element and a double concave lens element which has a first refracting surface R1 of a convex curvature forwardly directed toward the object side. The second component II is a double concave singlet which has a front surface R4 of stronger concave curvature, or having a smaller radius of concave curvature than that of the rear surface thereof and is rearwardly spaced in an axial distance D3 from Component I. The third component III is a positive meniscus singlet which has a rear surface R7 of convex curvature rearwardly directd toward the image plane, and is spaced in an axial distance D5 from Component II. The fourth component IV is a positive convex singlet which has a front surface R8 of stronger convex curvature or having a smaller radius of convex curvature forwardly directed toward the object side. The adjacent surfaces R7 and R8 of Components III and IV are characterized in that the surface R8 of Component IV is flatter than the surface R7 of Component III. Further, the axial distance from the first surface R1 of Component I to the first surface R4 of Component II or the sum of the axial thicknesses D1 and D2 of the front and rear lens elements of Component I and the axial separation D3 between Components I and II is longer than the axial distance from the second surface of Component II to the second surface of Component III, or the sum of the axial separation D5 between Components II and III and the axial thickness D6 of Component III. The arrangement and construction of the components of the lens system according to the present invention may be considered to be of modified triplet type from the standpoint of the basic lens design, for which the rear lens component of the triplet type objective is formed by two convex lenses. By the provision of the two convex lenses in the rear lens component it is made possible to decrease the refractive powers of each surface with decrease in residual spherical aberrations. However, these two convex lenses, namely, Components III and IV, are spaced apart from the diaphragm at so long distance that extra-axial pencils of rays pass practically through the marginal portions thereof to cause the production of extra-axial image aberrations. In order to minimize such image aberrations, the relationship between the adjacent surfaces of Components III and IV is set forth as R7 < R8. Component II of a concave lens plays a roll of cancelling various residual aberrations of the positive lens of Component I. As far as the extraaxial aberration correction is concerned, it is preferred to place component II near Component III. From this point of view, the relationship D1 + D2 + D3 > D5 + D6 is herein set forth. To impart a refractive power of a predetermined magnitude to Component II, the front surface R4 rather than the rear surface R5 is provided with a smaller radius of curvature, thereby contributing a large proportion of the refractive power to Component II, or otherwise residual aberrations are deteriorated as the incident angles of extra-axial pencils of rays impinging upon the rear surface R5 increases. Under the condition that D1 + D2 + D3 < D5 + D6, the axial separation between Components I and II is relatively long. In order to effect a high degree of correction of chromatic aberrations under such situation, Component I is constructed in the form of a doublet of lens elements cemented together at their adjoining surfaces. The present invention in its broader aspects has been described with respect to the optical constructional principle. In the practice of the present invention, however, good image quality can be obtained by the use of certain relationships set out in more detail below which define the limits for an optimum lens design.

(1) $0.55f < \Sigma D > 0.9f$ (2) $1.70 < \bar{N}_{convex}$ $$(3) \quad 1.4 < \frac{R_8}{|R_7|} < 2.5; \quad R7<0$$

$$(4) \quad 0.12f < (D1 + D2 + D3) - (D5 + D6) < 0.3f$$

$$(5) \quad 0.6f < R5 < 1.2f$$

$$(6) \quad 0.005 < \left(\frac{1}{V_2} - \frac{1}{V_1}\right) < 0.020$$

wherein $f$ is the overall focal length of the entire lens system; $\Sigma D$ is the total physical length of the entire lens system; R5, R7 and R8 are the radii of curvature of the fifth, seventh and eighth refracting surfaces counting from the front respectively; D1, D2, D3, D5 and D6 are the first, second, third, fifth and sixth axial distances between successive refracting surfaces respectively; $N_{convex}$ is the mean value of the refractive indices of materials of which all the convex lens element are made; and V1 and V2 are the Abbe numbers of the convex and concave lens elements respectively constituting said first component.

As the pupil of an objective of front diaphragm type lies outwardly of the lens system, the diameter of the rear lens is unavoidably increased and a high degree of correction of extra-axial aberrations is more difficult to accomplish. These problems may be neglected when designing objectives of the type having, though large relative aperture, a small field angle, and objectives of the type having, though relatively wide field angle, a small relative aperture. On the other hand, as an objective has a large relative aperture of at least $f/2.0$ and field angle as great as 44° as in the present invention, the solution of aberrational problems is made complicated.

Relationship (1): The diameter of the rear lens may be decreased with decrease in the total length of the complete objective. As the total length is shortened, however, the refractive powers of each lens element are necessarily strengthened to thereby make it difficult to correct particularly spherical aberrations, so that an objective having a large relative aperture is hardly obtainable. Relationship (1) is set out for the purposes of facilitating the minimization of the diameter of the rear lens of a large aperture objective adapted for use with a diaphragm located in front of the objective while permitting the objective to have a field angle of as great as 44°. When the upper limit of relationship (1) is violated, the required diameter of the rear lens is increased so that a difficulty is created in assembling the resultant objective with a given camera body. When the lower limit is violated, the solution of aberrational problems can not be facilitated even by the use of relationships to be subsequently described.

Relationship (2): Spherical aberrations and the Petzval sum tend to over-correction when the total length of the complete objective is restricted in the range defined by relationship (1). For this reason, a relatively high refractive indices of glasses have to be selected for employment in the convex lens elements. For facilitating a high standard correction of spherical aberrations and the Petzval sum with an objective having a large aperture of more than $f/2.0$, it is necessary that the mean value of the refractive indices of all the convex lens elements satisfies at least relationship (2). The upper limit of relationship (2) is not given, but it may be the presently available maximum refractive index of glass.

Relationship (3): The reason why the surfaces R7 and R8 of strong convex curvature of Components III and IV are particularly selected for subject to relationship (3) is to define the surfaces R7 and R8 of such configurations that extra-axial aberrations and particularly coma aberration are minimized. When the lower limit is violated, coma aberration is intensified. When the upper limit is violated, the spherical aberrations are intensified.

Relationship (4): When the lower limit is violated, a high degree of correction of extra-axial aberrations are more difficult to accomplish and the diameter of the rear lens is increased. When the upper limit is violated, spherical aberrations are deteriorated.

Relationship (5): A preferable balance of astigmatism is effected with the rear surface R5 of controlled curvature of the concave lens of Component II. When the upper limit is violated, under-correction of astigmatism results. When the lower limit is violated, over-correction of astigmatism results.

Relationship (6): determines the range of acceptable differences between the dispersive indices of the convex and concave lens elements of Component I, When the lower limited is violated, the concave lens of Component II has to compensate for chromatic aberrations to so large extent that when longitudinal chromatic aberrations are over-corrected, lateral chromatic aberrations are caused to result in over-correction. When the upper limit is violated, the situation is reversed. Thus, in any case, good states of correction of longitudinal chromatic aberrations as well as lateral chromatic aberrations can not be effected simultaneously.

Two examples of a specific objective of the present invention may be constructed in accordance with the numerical data given in Tables 1 and 2 below wherein;

R: the radii of curvature of each lens surface with the respective refracting surfaces being numbered from the front to the rear of the objective and being identified respectively by a subscript numeral for each R D: the axial spacings between successive refracting surfaces with each D being identified by its numerical subscript successively from front to rear N: the refractive indices of each lens element for the spectral D line of sodium with each N being identified by its numerical subscript successively from front to rear V: the dispersive indices of each lens element with each V being identified by its numerical subscript successively from front to rear.

Table 1 (FIG. 1)

| Example 1: | | |
|---|---|---|
| $f = 26.0$ | F - number = 2.0 | $2\omega = 44.7°$ |
| $R_1 = 15.445$ | | |
| $D_1 = 3.0$ | $N_1 = 1.77250$ | $V_1 = 49.6$ |
| $R_2 = -44.635$ | | |
| $D_2 = 1.85$ | $N_2 = 1.64769$ | $V_2 = 33.8$ |
| $R_3 = 45.846$ | | |
| $D_3 = 4.23$ | | |
| $R_4 = -15.233$ | | |
| $D_4 = 1.63$ | $N_3 = 1.68893$ | $V_3 = 31.1$ |
| $R_5 = 21.407$ | | |
| $D_5 = 1.2$ | | |
| $R_6 = -33.113$ | | |
| $D_6 = 2.73$ | $N_4 = 1.77250$ | $V_4 = 49.6$ |
| $R_7 = -12.198$ | | |
| $D_7 = 0.15$ | | |
| $R_8 = 20.022$ | | |
| $D_8 = 2.1$ | $N_5 = 1.77250$ | $V_5 = 49.6$ |
| $R_9 = 66.210$ | | |

Table 1 (FIG. 1)-continued

Example 1:

ΣD = 16.89

Table 2

Aberration Coefficient

| No. | I | II | III | P | V |
|---|---|---|---|---|---|
| 1 | 1.1725 | 0.7642 | 0.4981 | 0.7336 | 0.8029 |
| 2 | 0.4133 | −0.1479 | 0.0529 | 0.0249 | −0.0278 |
| 3 | 0.1509 | −0.2833 | 0.5316 | −0.2229 | −0.5794 |
| 4 | −3.2651 | 0.6392 | −0.1222 | −0.6961 | 0.1608 |
| 5 | −0.3557 | −0.6543 | −1.2038 | −0.4954 | −3.1261 |
| 6 | 0.0029 | −0.0169 | 0.0987 | −0.3422 | 1.4213 |
| 7 | 2.1506 | 0.1903 | 0.0168 | 0.9288 | 0.0837 |
| 8 | −0.0147 | −0.0533 | −0.1932 | 0.5659 | 1.3506 |
| 9 | 0.2249 | −0.2592 | 0.2987 | −0.1711 | −0.1471 |
| Σ | 0.4797 | 0.1788 | −0.0252 | 0.3255 | −0.0612 |

Table 3 (FIG. 3)

Example 2:

| | | |
|---|---|---|
| $f = 26.0$ | F-number = 1.8 | $2\omega = 44.7°$ |
| $R_1 = 16.333$ | | |
| $D_1 = 5.0$ | $N_1 = 1.78590$ | $V_1 = 44.2$ |
| $R_2 = -43.284$ | | |
| $D_2 = 1.0$ | $N_2 = 1.75520$ | $V_2 = 27.5$ |
| $R_3 = 123.054$ | | |
| $D_3 = 3.88$ | | |
| $R_4 = -18.019$ | | |
| $D_4 = 1.97$ | $N_3 = 1.75520$ | $V_3 = 27.5$ |
| $R_5 = 20.840$ | | |
| $D_5 = 1.4$ | | |
| $R_6 = -26.607$ | | |
| $D_6 = 3.1$ | $N_4 = 1.77250$ | $V_4 = 49.6$ |
| $R_7 = -12.558$ | | |
| $D_7 = 0.1$ | | |
| $R_8 = 21.232$ | | |
| $D_8 = 3.0$ | $N_5 = 1.78590$ | $V_5 = 44.2$ |
| $R_9 = 119.791$ | | |
| ΣD = 19.45 | | |

Table 4

Aberration Coefficients

| No. | I | II | III | P | V |
|---|---|---|---|---|---|
| 1 | 0.9940 | 0.6818 | 0.4676 | 0.7005 | 0.8012 |
| 2 | 0.0782 | −0.0272 | 0.0095 | 0.0059 | −0.0053 |
| 3 | 0.5532 | −0.5732 | 0.5938 | −0.0909 | −0.5210 |
| 4 | −2.9460 | 0.6899 | −0.1616 | −0.6208 | 0.1832 |
| 5 | −0.2299 | −0.4792 | −0.9990 | −0.5368 | −3.2019 |
| 6 | −0.0022 | 0.0060 | −0.0165 | −0.4259 | 1.2114 |
| 7 | 1.6650 | 0.1720 | 0.0178 | 0.9023 | 0.0950 |
| 8 | −0.0109 | −0.0443 | −0.1802 | 0.5389 | 1.4583 |
| 9 | 0.3084 | −0.2547 | 0.2103 | −0.0955 | −0.0948 |
| Σ | 0.4099 | 0.1711 | −0.0584 | 0.3777 | −0.0740 |

Figures 2A, 2B, 2C:
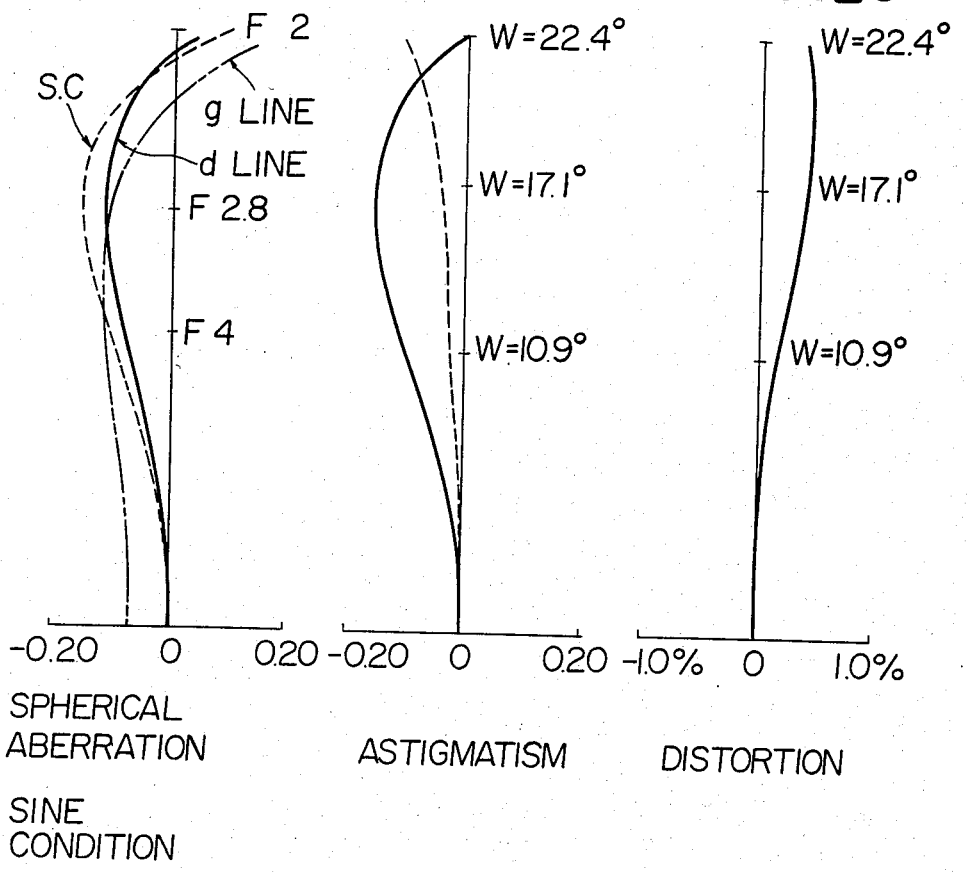
FIGS. 2A, 2B and 2C are curves illustrating various aberrations of the lens of FIG. 1.

FIGS. 2A, 2B and 2C are graphic representations of corrections attained for various aberrations in the above-mentioned Examples 1 and 2 respectively. It will be appreciated that by the use of four lens components with five lens elements, high quality objectives of the front diaphragm type are economically produced which have a relative aperture of at least f/2.0 while nevertheless preserving a good state of correction of aberrations.

The numerical values of relationships (1) – (6) in Examples 1 and 2 are given in Table 5 below.

Table 5

| | Example 1 | Example 2 |
|---|---|---|
| (1) | 0.65f | 0.748f |
| (2) | 1.7725 | 1.7814 |
| (3) | 1.641 | 1.691 |
| (4) | 0.198f | 0.207f |
| (5) | 0.823f | 0.802f |
| (6) | 0.0094 | 0.0137 |

Figures 4A, 4B, 4C:
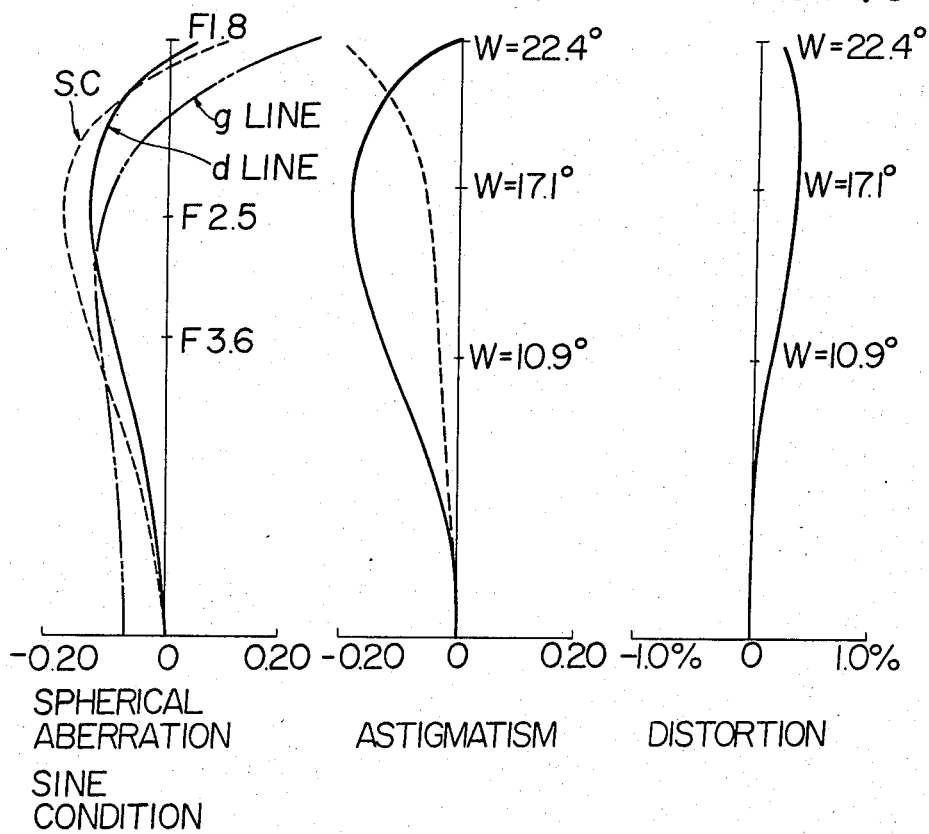
FIGS. 4A, 4B and 4C are curves illustrating various aberrations of the lens of FIG. 3.

Relationships (1) – (6) may be modified as follows without causing appreciable deteriolation of aberrations from the states shown in FIGS. 2 and 4.

(1') $0.55f < \Sigma D < 0.8f$ (2') $1.7 < \bar{N}_{convex}$ (3') $1.6 < \dfrac{R8}{|R7|} < 1.75$ (4') $0.15f < (D1+D2+D3) - (D5+D6) < 0.25f$ (5') $0.7f < R5 < 0.95f$ (6') $0.005 < \left( \dfrac{1}{V2} - \dfrac{1}{V1} \right) < 0.018$

What is claimed is:

1. A large aperture photographic objective lens system adapted for use with a diaphragm located forwardly thereof, said objective comprising in order from the object side:

a first positive meniscus doublet lens component which is convex toward the object side and is composed of a double convex lens and a double concave lens cemented together at their adjoining surfaces;

a second double concave single lens component a strong concave curvature directed forwardly toward the object side and being rearwardly spaced from said first component;

a third positive meniscus singlet lens component which is convex toward the image side and lying substantially in edge contact with said second component; and a fourth convex singlet lens component having a refracting surface of strong convex curvature directed toward the object side and being spaced from said third component; said refracting surface of strong convex curvature of the fourth component being flatter than the adjacent surface of said third component; and the axial length from the first surface of said first component to the first surface of said second component being longer than the axial length from the second surface of said second component to the second surface of said third component.

2. A large aperture photographic objective as described in claim 1, wherein said fourth component has a second surface of concave curvature rearwardly directed toward the image side.

3. A large aperture photographic objective lens system for use with a diaphragm located forwardly thereof, said objective comprising in order from the object side:

a first positive meniscus doublet lens component which is convex toward the object side and is composed of a double convex lens and a double concave lens cemented together at their adjoining surfaces;

a second double concave single lens component having a strong concave curvature directed forwardly toward the object side and being rearwardly spaced from said first component;

a third positive meniscus singlet lens component which is convex toward the image side and lying substantially in edge contact with said second component; and a fourth convex singlet lens component having a refracting surface of strong convex curvature directed toward the object side and being spaced from said third component, said fourth component also having a second surface of concave curvature rearwardly directed toward the image side;

said refracting surface of strong convex curvature of the fourth component being flatter than the adjacent surface of said third component; and the axial length from the first surface of said first component to the first surface of said second component being longer than the axial length from the second surface of said second component to the second surface of said third component, wherein the characteristics of the various lenses of the four lens components and their spatial relationships to each otehr being substantially of the proportions indicated by the numerical data in the following table The focal length of the entire system f = 26.0
F-number = 2.0
The field angle 2ω = 44.7°

$R_1 = 15.445$
  $D_1 = 3.0$    $N_1 = 1.77250$    $V_1 = 49.6$
$R_2 = -44.635$
  $D_2 = 1.85$   $N_2 = 1.64769$    $V_2 = 33.8$
$R_3 = 45.846$
  $D_3 = 4.23$
$R_4 = -15.233$
  $D_4 = 1.63$   $N_3 = 1.68893$    $V_3 = 31.1$
$R_5 = 21.407$
  $D_5 = 1.2$
$R_6 = -33.113$
  $D_6 = 2.73$   $N_4 = 1.77250$    $V_4 = 49.6$
$R_7 = -12.198$
  $D_7 = 0.15$
$R_8 = 20.022$
  $D_8 = 2.1$    $N_5 = 1.77250$    $V_5 = 49.6$
$R_9 = 66.210$
  $\Sigma D = 16.89$ wherein R denotes the radii of curvature of each lens surface with the respective refracting surfaces being numbered from front to rear and being identified respectively by a subscript numeral for each R; D denotes the axial spacings between successive refracting surfaces with each D being identified by its numerical subscript successively from front to rear; N denotes the refractive indices of each lens for the spectral D line of sodium with each N being identified by its numerical subscript successively from front to rear; and V denotes the dispersive indices of each lens with each V being identified by its numerical subscript successively from front to rear.

4. A large aperture photographic objective lens system for use with a diaphragm located forwardly thereof, said objective comprising in order from the object side:

a first positive meniscus doublet lens component which is convex toward the object side and is composed of a double convex lens and a double concave lens cemented together at their adjoining surfaces;

a second double concave single lens component having a strong concave curvature directed forwardly toward the object side and being rearwardly spaced from said first component;

a third positive meniscus singlet lens component which is convex toward the image side and lying substantially in edge contact with said second component; and a fourth convex singlet lens component having a refracting surface of strong convex curvature directed toward the object side and being spaced from said third component, said fourth component also having a second surface of concave curvature rearwardly directed toward the image side; said refracting surface of strong convex curvature of the fourth component being flatter than the adjacent surface of said third component; and the axial length from the first surface of said first component to the first surface of said second component being longer than the axial length from the second surface of said second component to the second surface of said third component, wherein the characteristics of the various lenses of the four lens components and their spatial relationships to each other being substantially of the proportions indicated by the numerical data in the following table The focal length of the entire system f = 26.0
F-number = 1.8    The field angle 2ω = 44.7°

$R_1 = 16.333$
  $D_1 = 5.0$    $N_1 = 1.78590$    $V_1 = 44.2$
$R_2 = -43.284$
  $D_2 = 1.0$    $N_2 = 1.75520$    $V_2 = 27.5$
$R_3 = 123.054$
  $D_3 = 3.88$
$R_4 = -18.019$
  $D_4 = 1.97$   $N_3 = 1.75520$    $V_3 = 27.5$
$R_5 = 20.840$
  $D_5 = 1.4$
$R_6 = -26.607$
  $D_6 = 3.1$    $N_4 = 1.77250$    $V_4 = 49.6$
$R_7 = -12.558$
  $D_7 = 0.1$
$R_8 = 21.232$
  $D_8 = 3.0$    $N_5 = 1.78590$    $V_5 = 44.2$
$R_9 = 119.791$
  $\Sigma D = 19.45$ wherein R denotes the radii of curvature of each lens surface with the respective refracting surfaces being numbered from front to rear and being identified respectively by a subscript numeral for each R; D denotes the axial spacings between successive refracting surfaces with each D being identified by its numerical subscript successively from front to rear; N denotes the refractive indices of each lens for the spectral D line of sodium with each N being identified by its numerical subscript successively from front to rear; and V denotes the dispersive indices of each lens with each V being identified by its numerical subscript successively from front to rear.

* * * * *